(12) United States Patent
Ryu et al.

(10) Patent No.: US 9,163,096 B2
(45) Date of Patent: Oct. 20, 2015

(54) METHOD FOR PRODUCING NITRILE RUBBER

(75) Inventors: Dong Jo Ryu, Daejeon (KR); Se Eun Lee, Seoul (KR); Sin Gun Kang, Seoul (KR); Seon Hee Han, Daejeon (KR); Jeong Heon Ahn, Jeollanam-do (KR); Jeong Hoon Jo, Daejeon (KR); Hee Jung Jeon, Seoul (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/352,984

(22) PCT Filed: Aug. 3, 2012

(86) PCT No.: PCT/KR2012/006184
§ 371 (c)(1),
(2), (4) Date: Aug. 1, 2014

(87) PCT Pub. No.: WO2013/077530
PCT Pub. Date: May 30, 2013

(65) Prior Publication Data
US 2014/0350203 A1    Nov. 27, 2014

(30) Foreign Application Priority Data

Nov. 24, 2011 (KR) .................. 10-2011-0123263
Jul. 31, 2012 (KR) .................. 10-2012-0083569

(51) Int. Cl.
| | |
|---|---|
| *C08F 2/00* | (2006.01) |
| *C08F 36/00* | (2006.01) |
| *C08F 20/44* | (2006.01) |
| *C08F 2/24* | (2006.01) |
| *C08F 2/26* | (2006.01) |
| *C08F 36/04* | (2006.01) |
| *C08K 5/521* | (2006.01) |

(52) U.S. Cl.
CPC ... *C08F 2/24* (2013.01); *C08F 2/26* (2013.01); *C08F 36/04* (2013.01); *C08K 5/521* (2013.01)

(58) Field of Classification Search
CPC ............. C08F 2/24; C08F 36/04; C08F 2/26; C08K 5/521; C08L 9/02
USPC ........................................ 526/193, 335, 341
See application file for complete search history.

(56) References Cited

U.S. PATENT DOCUMENTS

| | | | |
|---|---|---|---|
| 4,810,742 A | 3/1989 | Mundhenke | |
| 8,153,712 B2 * | 4/2012 | Nagamori et al. | ............. 524/236 |
| 2010/0168302 A1 * | 7/2010 | Nagamori et al. | ............. 524/186 |

FOREIGN PATENT DOCUMENTS

| | | |
|---|---|---|
| JP | 2003040915 | 2/2003 |
| JP | 3445615 | 6/2003 |
| KR | 10-2002-0039855 A | 5/2002 |
| KR | 1020100133638 | 12/2010 |
| KR | 1020110062233 | 6/2011 |
| WO | WO 2007/072900 | * 6/2007 |

OTHER PUBLICATIONS

Database WPI, "Process Produce Rubber Latex Stabilized", Thompson Scientific, London, GB, AN-2002-711173, XP-002739726, and KR 10-2002-0039855A (LG Chem Investment, Ltd.), May 30, 2002, Abstract.

* cited by examiner

*Primary Examiner* — William Cheung
(74) *Attorney, Agent, or Firm* — Dentons US LLP

(57) ABSTRACT

Disclosed is a method for producing a nitrile rubber comprising adding 0.1 to 5 parts by weight of at least one phosphate emulsifier selected from the group consisting of monoalkyl ether phosphate (MAP) represented by the following Formula 1 and dialkyl ether phosphate (DAP) represented by the following Formula 2, with respect to 100 parts by weight of monomers constituting the nitrile rubber. The method minimizes mold contamination during molding of produced nitrile rubber, eliminates the necessity of any process of removing mold contaminants, improves production efficiency and thus reduces defect rates of final molded articles.

11 Claims, No Drawings

METHOD FOR PRODUCING NITRILE RUBBER

This application is a 35 USC §371 National Stage entry of International Application No. PCT/KR2012/006184, filed on Aug. 3, 2012, which claims priority from Korean Patent Application Nos. 10-2011-0123263, filed on Nov. 24, 2011 and 10-2012-0083569, filed on Jul. 31, 2012, in the Korean Intellectual Property Office, all of which are incorporated herein by reference in their entirety.

TECHNICAL FIELD

The present invention relates to a method for producing a nitrile rubber. More specifically, the present invention relates to a method for producing a nitrile rubber using a phosphate emulsifier having superior thermal stability alone or a combination thereof with an aliphatic organic acid or sulfonate emulsifier to minimize mold contamination during molding of produced nitrile rubber, eliminate the necessity of any process of removing mold contaminants, improve production efficiency and thereby reduce defect rates of final molded articles.

BACKGROUND ART

In general, a nitrile rubber is a random copolymer of acrylonitrile and butadiene, which is produced at an acrylonitrile content ranging from 15 to 50%.

The most essential advantage of nitrile rubber is considerably excellent oil resistance thereof. This is due to polarity of nitrile present in acrylonitrile. For this reason, physical properties of nitrile rubbers greatly vary depending upon amounts of nitrile incorporated in nitrile rubbers. Regarding correlations between oil resistance, nitrile content and swelling, and between aniline point (defined as the minimum temperature at which equal volumes of hydrocarbon and aniline are completely miscible wherein the aniline point enables estimation of components of hard mineral oils such as gasoline) of oils and swelling, as content of nitrile increases, oil resistance becomes better, and as aniline point increases, swelling decreases. As used herein, the term "oils" refers to mineral oils, that is, petroleum hydrocarbons which are widely used as lubricants or hydraulic operating oils. In particular, it should be noted that these oils are preferably used after evaluation of oil resistance of rubbers at an aniline point and measurement of variation in physical properties or swelling in oils used as seals, because the oils contain a variety of additives which may have any effect on the rubbers. In addition, as a result of measurement of compression set distortion of O-rings in hot oils for a long time, it can be seen that the O-rings exhibit superior properties and that O-rings slightly increasing in volume are presumed to exhibit superior sealing properties as compared to O-rings decreasing volume, based on the fact that O-rings slightly increasing in volume exhibit good properties. Nitrile rubbers are the most suitable for use in O-rings for seals of lubricating oils, operating oils, fuel oils or the like, V packings and oil seals in all fields including industrial machines, construction equipment, automation systems, cars, airplanes and the like and are used in great amounts due to excellent oil resistance. Temperature at which nitrile rubbers are used greatly varies according to mixing conditions, but low contents of nitrile are used for apparatuses, airplanes and the like operating at −50 to −120° C., in particular, at low temperatures in polar regions or cold climes. In addition, high contents of nitrile exhibit excellent heat resistance or mechanical properties and superior gas barrier properties, thus being applicable to vacuum conditions of 10 torr or less. Nitrile rubber is polymerized by common low-temperature emulsion polymerization and coagulated using a coagulant which is then used in the form of a veil. However, there is a need to solve a problem of low production efficiency due to repeated removal of residual foreign substances present on molds after molding of nitrile rubbers.

DISCLOSURE

Technical Problem

Therefore, the present invention has been made in view of the above problems, and it is one object of the present invention to provide a method for producing a nitrile rubber which minimizes mold contamination during molding of nitrile rubbers, eliminates the necessity of any process of removing mold contaminants and improves production efficiency, thus reducing defect rates of final molded articles.

The objects of the present invention can be accomplished by the present invention described below.

Technical Solution

In accordance with an aspect of the present invention, the above and other objects can be accomplished by the provision of a method for producing a nitrile rubber comprising adding 0.1 to 5 parts by weight of at least one phosphate emulsifier selected from the group consisting of monoalkyl ether phosphate (MAP) represented by the following Formula 1 and dialkyl ether phosphate (DAP) represented by the following Formula 2, with respect to 100 parts by weight of monomers constituting the nitrile rubber.

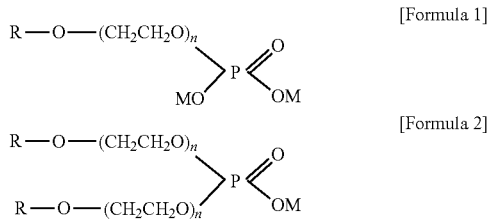

wherein R represents an alkyl or alkylaryl group, M represents H, Na or K, and n is an integer.

Advantageous Effects

As apparent from the fore-going, the method for producing nitrile rubbers using a phosphate emulsifier having superior thermal stability alone or a mixture thereof, or a combination thereof with an aliphatic organic acid or sulfonate emulsifier according to the present invention advantageously minimizes mold contamination during molding of produced nitrile rubbers, eliminates the necessity of any process of removing mold contaminants, improves production efficiency and thus reduces defect rates of final molded articles.

BEST MODE

In one aspect, the present invention is directed to a method for producing a nitrile rubber comprising adding 0.1 to 5 parts by weight of at least one phosphate emulsifier selected from the group consisting of monoalkyl ether phosphate (MAP) represented by the following Formula 1 and dialkyl ether phosphate (DAP) represented by the following Formula 2, with respect to 100 parts by weight of monomers constituting the nitrile rubber.

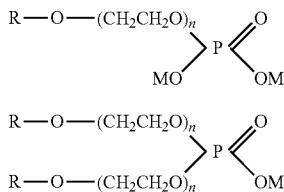

wherein R represents an alkyl or alkylaryl group, M represents H, Na or K, and n is an integer.

In Formulae 1 and 2, R represents a C5-C20 alkyl or alkylaryl group, specifically a C8-C18 alkyl or alkylaryl group.

In Formulae 1 and 2, n means an average number of moles of ethylene oxide reacting with one mole of a hydrophobe.

Specifically, the monoalkyl ether phosphate is selected from the group consisting of lauryl ether hexaethylene oxide phosphoric acid, myristic ether hexaethylene oxide phosphoric acid, palmitic ether hexaethylene oxide phosphoric acid, stearic ether hexaethylene oxide phosphoric acid, lauryl ether octaethylene oxide phosphoric acid, myristic ether octaethylene oxide phosphoric acid, palmitic ether octaethylene oxide phosphoric acid, and stearic ether octaethylene oxide phosphoric acid, and the group consisting of potassium salts and sodium salts of these phosphoric acids, and the dialkyl ether phosphate is selected from the group consisting of di(lauryl ether hexaethylene oxide)phosphoric acid, di(myristic ether hexaethylene oxide)phosphoric acid, di(palmitic ether hexaethylene oxide)phosphoric acid, di(stearic ether hexaethylene oxide)phosphoric acid, di(myristic ether octaethylene oxide)phosphoric acid, di(palmitic ether octaethylene oxide)phosphoric acid, and di(stearic ether octaethylene oxide)phosphoric acid and the group consisting of potassium salts and sodium salts of these phosphoric acids.

When the phosphate emulsifier is added in an amount less than 0.1 parts by weight, reduction of mold contamination is disadvantageously insufficient, and when the phosphate emulsifier is added in an amount more than 5 parts by weight, the reduction of mold contamination is significant, but reaction speed is high and change in structure of nitrile rubber causing gelling is disadvantageously generated due to excessively high amount of phosphate emulsifier.

When the monoalkyl ether phosphate represented by Formula 1 above and the dialkyl ether phosphate represented by Formula 2 are blended, a mix weight ratio therebetween is 1:99 to 99:1, specifically, 5:95 to 95:5, more specifically, 10:90 to 90:10.

An aliphatic organic acid or sulfonate emulsifier may be further added in an amount of 0.1 to 5 parts by weight with respect to 100 parts by weight of monomers constituting the nitrile rubber. The aliphatic organic acid is preferably selected from the group consisting of oleic acid, rosin acid, lauric acid, myristic acid, palmitic acid, stearic acid, eicosanoic acid and mixtures thereof, more preferably, oleic acid and rosin acid, but the present invention is not limited thereto.

The sulfonate emulsifier is preferably selected from the group consisting of sodium salts of naphthalene sulfonic acid, alkyl aryl sulfonate, alkali methyl alkyl sulfate, sulfonated alkylester, alkali salts of rosin acid and mixtures thereof, more preferably, sodium 1-(n-alkyl-naphthalene-4-sulfonate) (SANS) or sodium dodecyl benzene sulfonate (SDBS), but the present invention is not limited thereto.

The nitrile rubber may be a random copolymer of a vinyl cyanide compound and a conjugated diene compound.

The vinyl cyanide compound is selected from the group consisting of acrylonitrile, methacrylonitrile, fumaronitrile, α-chloronitrile, α-cyanoethyl acrylonitrile and mixtures thereof. Of these, acrylonitrile and methacrylonitrile are preferred and, in particular, acrylonitrile is most preferred.

Specifically, the conjugated diene compound is selected from the group consisting of 1,4-butadiene, 1,3-butadiene, 2,3-dimethyl-1,3-butadiene, 2-ethyl-1,3-butadiene, 1,3-pentadiene, isoprene and mixtures thereof. Of these, 1,3-butadiene and isoprene are preferred and, in particular, 1,4-butadiene is most preferred.

The vinyl cyanide compound is used in an amount of 10 to 60% by weight and the conjugated diene compound is used in an amount of 40 to 90% by weight.

The production of nitrile rubber may be carried out by emulsion polymerization.

Hereinafter, preferred examples will be provided for better understanding of the present invention. These examples are only provided to illustrate the present invention and it will be apparent to those skilled in the art that various modifications and alternations are possible within the scope and technical range of the present invention. Such modifications and alternations fall within the scope of claims included herein.

EXAMPLE

Example 1

2.0 parts by weight of an emulsifier obtained by saponifying oleic acid as aliphatic organic acid with potassium hydroxide (KOH), 2.0 parts by weight of RS-610 (produced by Rhodia) as a phosphate emulsifier, 0.1 parts by weight of an initiator, 0.7 parts by weight of a molecular weight controller, and 200 parts by weight of water were added to 100 parts by weight of monomers comprising 65 parts by weight of 1,4-butadiene and 35 parts by weight of acrylonitrile in a reaction vessel, followed by emulsion polymerization. The polymerization reaction was stopped by addition of a polymerization terminator when conversion ratio reached 80%. The polymerization time was 7 hours. Then, a coagulum was obtained through coagulation of common emulsion polymerization and was dried using a roll drier to produce a rubber.

Examples 2 and 3

Rubbers were produced in the same manner as in Example 1 except that an amount of emulsifier used for polymerization was changed as shown in Table 1.

Examples 4 to 9

Rubbers were produced in the same manner as in Example 1 except that the amount and type of emulsifier used for polymerization were changed as shown in Table 1.

Examples 10 to 17

Rubbers were produced in the same manner as in Example 1 except that 5.0 parts by weight of the phosphate emulsifier was added alone as the emulsifier used for polymerization, and the number of carbon atoms (R) of alkyl and the number of ethylene oxide (n) in the phosphate emulsifier were changed as shown in Table 2.

Examples 18 to 21

Rubbers were produced in the same manner as in Example 1 except that 5.0 parts by weight of the phosphate emulsifier was used alone as the emulsifier used for polymerization, and a mix ratio of monoalkyl ether phosphate (MAP) and dialkyl ether phosphate (DAP) in the phosphate emulsifier was changed as shown in Table 2.

Comparative Examples 1 to 3

Rubbers were produced in the same manner as in Example 1 except that a commonly used emulsifier as shown in Table 1 was used alone for polymerization, instead of the phosphate emulsifier.

Test Example

Physical properties of rubbers obtained in Examples Comparative Examples were evaluated in accordance with the following method and results thus obtained are shown in Tables 1 and 2.
Evaluation of mold contamination: mold contamination was evaluated by placing a predetermined amount of produced nitrile rubber on a mold using a press, allowing the rubber to stand at 130° C. for 300 seconds, removing the nitrile rubber and repeating the previous process 10 times. Finally, levels of contaminants stained on the surface of the mold were evaluated on a scale of 1 to 10 (10: least contaminated, 1: seriously contaminated).

From results of evaluation of mold contamination, it can be seen that nitrile rubbers produced using the phosphate emulsifier alone or a combination thereof with a commonly used emulsifier according to the present invention remarkably reduced mold contamination, regardless of type of commonly used emulsifier.

What is claimed is:

1. A method for producing a nitrile rubber comprising preparing a mixture comprising 0.1 to 5 parts by weight of at least one phosphate emulsifier selected from the group consisting of monoalkyl ether phosphate (MAP) represented by the following Formula 1 and dialkyl ether phosphate (DAP) represented by the following Formula 2 with respect to 100 parts by weight of monomers constituting the nitrile rubber and the monomers constituting the nitrile rubber; and producing the nitrile rubber by carrying out an emulsion polymerization of the monomers constituting the nitrile rubber

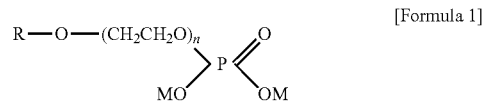

[Formula 1]

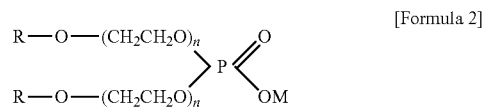

[Formula 2]

wherein R represents an alkyl or alkylaryl group, M represents H, Na or K, and n is an integer.

2. The method according to claim 1, wherein the monoalkyl ether phosphate is selected from the group consisting of the monoalkyl ether phosphate wherein R represents a C5-C20 alkyl or alkylaryl group, and n is integer of 2 to 10.

TABLE 1

Results of evaluation of amounts of emulsifier used for polymerization and mold surface contamination

| | Type | Example 1 | Example 2 | Example 3 | Comparative Example 1 | Example 4 | Example 5 | Comparative Example 2 | Example 6 | Example 7 | Comparative Example 3 | Example 8 | Example 9 | Comparative Example 4 |
|---|---|---|---|---|---|---|---|---|---|---|---|---|---|---|
| Emulsifier | Base emulsifier | Oleic acid (phr) | | | | Rosin acid (phr) | | | SDBS [1] (phr) | | | SANS [2] (phr) | | |
| | | 2 | 4 | — | 4 | 3 | 5 | 5 | 1.8 | 3.5 | 3.5 | 1.5 | 3 | 3 |
| | Phosphate emulsifier | 2 | 0.1 | 5 | — | 2 | 0.1 | — | 1.8 | 0.1 | — | 1.5 | 0.1 | — |
| Mold contamination (based on 10-score) | | 10 | 9 | 10 | 3 | 8 | 6 | 1 | 9 | 8 | 2 | 10 | 9 | 3 |

[1] SDBS: sodium dodecyl benzene sulfonate
[2] SANS: sodium 1-(n-alkyl)naphthalene-4-sulfonate

TABLE 2

Results of evaluation of amounts of emulsifier used for polymerization and mold surface contamination

| Type | Example 10 | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
| Phosphate emulsifier | R = 12 n = 6 | R = 14 n = 6 | R = 16 n = 6 | R = 18 n = 6 | R = 12 n = 8 | R = 14 n = 8 | R = 16 n = 8 | R = 18 n = 8 | MAP/DAP = 90/10 | MAP/DAP = 60/40 | MAP/DAP = 40/60 | MAP/DAP = 10/90 |
| Mold contamination (Scale of 1 to 10) | 10 | 10 | 10 | 10 | 10 | 10 | 10 | 10 | 10 | 10 | 10 | 10 |

3. The method according to claim 1, wherein the dialkyl ether phosphate is selected from the group consisting of the dialkyl ether phosphate wherein R represents a C5-C20 alkyl or alkylaryl group and n is an integer of 2 to 10.

4. The method according to claim 1, wherein the monoalkyl ether phosphate and the dialkyl ether phosphate are used in a combination at a mix weight ratio of 1:99 to 99:1.

5. The method according to claim 1, wherein the mixture further comprises an aliphatic organic acid or sulfonate emulsifier in an amount of 0.1 to 5 parts by weight with respect to 100 parts by weight of monomers constituting the nitrile rubber.

6. The method according to claim 5, wherein the aliphatic organic acid comprises at least one selected from the group consisting of oleic acid, rosin acid, lauric acid, myristic acid, palmitic acid, stearic acid, and eicosanoic acid.

7. The method according to claim 5, wherein the sulfonate emulsifier comprises at least one selected from the group consisting of sodium salts of naphthalene sulfonic acid, alkyl aryl sulfonate, alkali methyl alkyl sulfate, sulfonated alkylester, and alkali salts of rosin acid.

8. The method according to claim 1, wherein the monomers constituting the nitrile rubber comprise a vinyl cyanide compound and a conjugated diene compound, and wherein the emulsion polymerization is configured to produce a nitrile rubber that is a random copolymer of the vinyl cyanide compound and the conjugated diene compound.

9. The method according to claim 8, wherein the vinyl cyanide compound comprises at least one selected from the group consisting of acrylonitrile, methacrylonitrile, fumaronitrile, α-chloronitrile and α-cyanoethyl acrylonitrile, and is used in an amount of 10 to 60% by weight.

10. The method according to claim 8, wherein the conjugated diene compound comprises at least one selected from the group consisting of 1,4-butadiene, 1,3-butadiene, 2,3-dimethyl-1,3-butadiene, 2-ethyl-1,3-butadiene, 1,3-pentadiene and isoprene, and is used in an amount of 40 to 90% by weight.

11. The method according to claim 8, wherein the vinyl cyanide compound comprises at least one selected from the group consisting of acrylonitrile, methacrylonitrile, fumaronitrile, α-chloronitrile and α-cyanoethyl acrylonitrile, and is used in an amount of 10 to 60% by weight, and
wherein the conjugated diene compound comprises at least one selected from the group consisting of 1,4-butadiene, 1,3-butadiene, 2,3-dimethyl-1,3-butadiene, 2-ethyl-1,3-butadiene, 1,3-pentadiene and isoprene, and is used in an amount of 40 to 90% by weight.

* * * * *